United States Patent [19]

Langford

[11] 4,193,319
[45] Mar. 18, 1980

[54] PUSH-PULL CABLE CORE WITH SELF-LUBRICATING COATING

[75] Inventor: William D. Langford, Stow, Ohio

[73] Assignee: Incom International Inc., Pittsburgh, Pa.

[21] Appl. No.: 610,592

[22] Filed: Sep. 5, 1975

[51] Int. Cl.$^2$ ............................................. F16C 1/10
[52] U.S. Cl. ................................................ 74/501 R
[58] Field of Search .................. 74/501 R, 501 P; 138/124, 125, 126, 127, 129, 118.1, 130, 131, 133, 140, DIG. 3; 64/1 R, 1 S, 2 R, 3

[56] References Cited

U.S. PATENT DOCUMENTS

| | | | |
|---|---|---|---|
| 1,970,702 | 8/1934 | Kuney | 74/501 X |
| 2,030,672 | 2/1936 | Winning | 74/502 |
| 2,643,146 | 6/1953 | Morse | 74/502 X |
| 2,773,781 | 12/1956 | Rodman | 138/DIG. 3 |
| 2,821,092 | 1/1958 | Cordora et al. | 74/501 R |
| 3,063,303 | 11/1962 | Cadwallader | 74/501 P |
| 3,093,162 | 6/1963 | Reiling | 74/501 P |
| 3,176,538 | 4/1965 | Hurlow | 74/501 R |
| 3,238,808 | 3/1966 | Barnard | 74/501 R |
| 3,266,527 | 8/1966 | Ross | 138/129 X |
| 3,350,959 | 11/1967 | Machate | 74/501 R |
| 3,369,426 | 2/1968 | Matz | 74/501 P |
| 3,734,139 | 5/1973 | Zafiroglu | 138/DIG. 3 X |
| 3,835,891 | 9/1974 | White | 138/125 |
| 3,908,704 | 9/1975 | Clement et al. | 138/DIG. 3 X |
| 3,913,625 | 10/1975 | Gazda et al. | 138/127 X |

OTHER PUBLICATIONS

1975–1976 Modern Plastics Encyclopedia, pp. 27–28.

*Primary Examiner*—Samuel Scott
*Assistant Examiner*—Wesley S. Ratliff, Jr.
*Attorney, Agent, or Firm*—James C. Wray

[57] ABSTRACT

A core is capable of being utilized within a conduit in a push-pull type remote control cable assembly. The core has a metallic wire member and includes a coating around the wire member which has an outer layer of TFE resin. An inner layer of the coating includes FEP resin which is bonded to the wire member to secure the coating thereabout.

13 Claims, 3 Drawing Figures

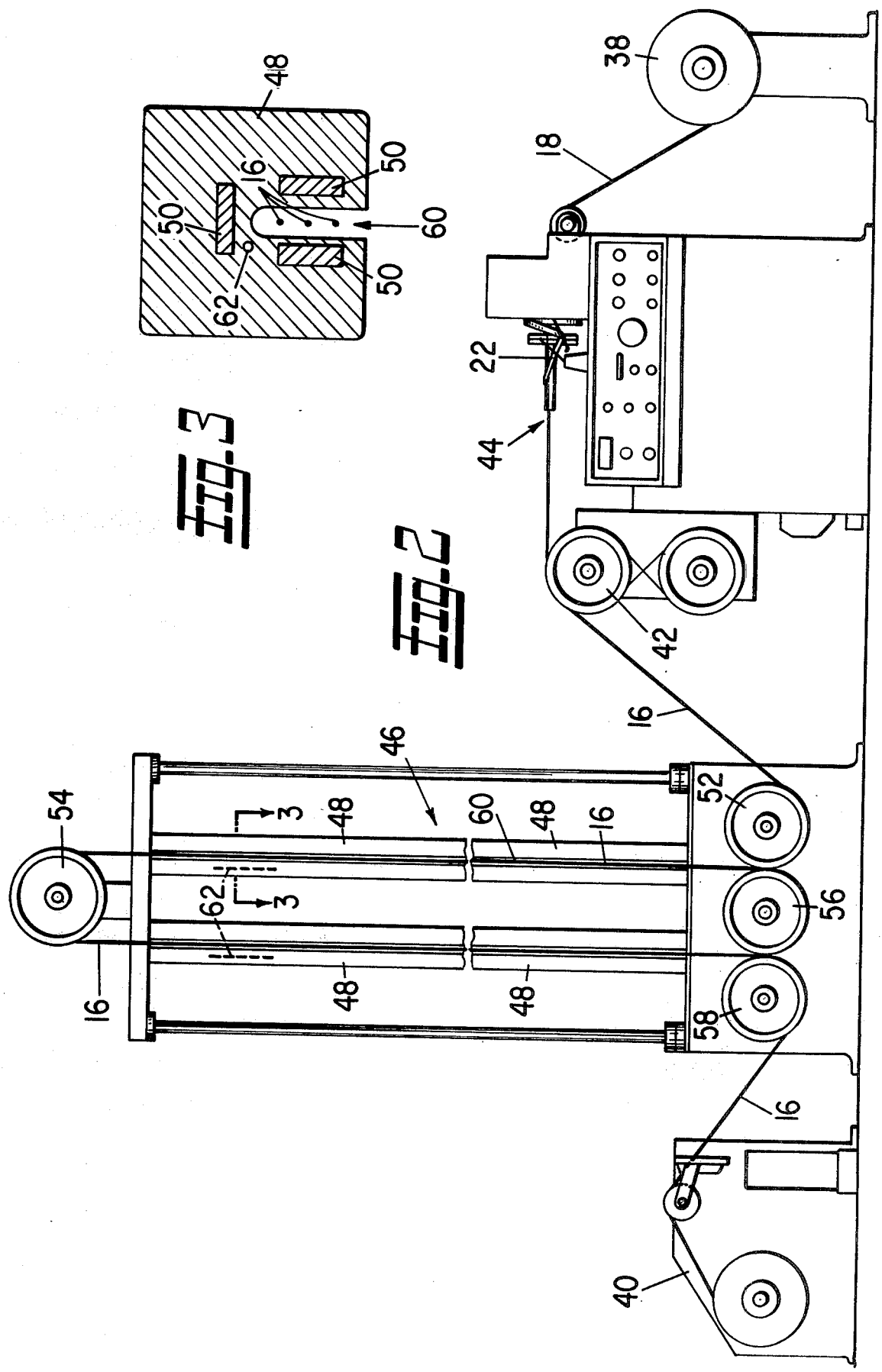

PUSH-PULL CABLE CORE WITH SELF-LUBRICATING COATING

BACKGROUND OF THE INVENTION

1. Field of the Invention

This invention relates to a core to be utilized in a push-pull cable assembly and, more specifically, to such a core which has a self-lubricating coating rigidly bonded to an interior metallic wire member.

2. Description of the Prior Art

There have heretofore been utilized a number of push-pull control cables which have a metallic core member which is coated with a self-lubricating material. For example, U.S. Pat. No. 3,176,538 and British Pat. No. 864,421 disclose such cables where polytetrafluoroethylene is utilized to provide the coating.

However, in these and other cables heretofore employed there has generally been a problem encountered when attempting to bond the polytetrafluoroethylene to the metallic core member. This is understandable when one considers that polytetrafluoroethylene is chosen in the first place for its low coefficient of sliding friction. The general problem with the bonding qualities of this material appears to stem from the fact that polytetrafluoroethylene cannot be melt-formed into finished products by conventional thermoplastic molding techniques but must be extruded or molded by techniques resembling those used for powdered metallurgy. Polytetrafluoroethylene becomes a gel at a transition temperature of about 620° F. to 640° F. and has an extremely high melt viscosity. Accordingly, polytetrafluoroethylene is usually provided in the form of particles which do not flow and melt together, but sinter, and sintered polytetrafluoroethylene does not readily adhere to a metallic surface.

As a result, it has generally been the practice in the past when providing a polytetrafluoroethylene coating to use either an extrusion method or a method of wrapping the metallic core material with an unsintered polytetrafluoroethylene tape which is later sintered. The tape has by necessity been overlapped so that, in both cases, the primary bonding that is produced by the sintering is the bonding of polytetrafluoroethylene to itself as it encircles the metallic core member. It has been observed in articles formed in this manner that any break in the coating endangers the integrity of the coating. The tape, for example, can be unwound because of the lack of bonding to the metal surface and the general tendency of the polytetrafluoroethylene to fail in areas of single thickness of tape which are located between the overlapped regions having two thicknesses of tape. The general lack of bonding of the polytetrafluoroethylene coating to the metal core member has been further evidenced by the existence of air pockets between the coating and the metallic core member. Consequently, even though the polytetrafluoroethylene coatings used on cable cores in the past have provided an excellent low-friction, self-lubricating surface, their reliability for prolonged or heavy-duty operations has been limited.

SUMMARY OF THE INVENTION

It is therefore an object to provide a core for a push-pull type remote control cable which has a self-lubricating coating which is bonded to the metallic core member.

It is a further object to provide a core of the type described in which the coating may only partially cover the metallic core member.

It is still another object to provide a push-pull cable utilizing a core of the type described.

It is yet another object to provide a method of making a core of the type described.

These and other objects of the invention are provided by the preferred embodiment of the present invention wherein the preferred core includes a metallic wire member which has at least a partial self-lubricating coating thereabout. The coating includes an outer layer of TFE resin and an inner layer of FEP resin. The FEP resin is bonded to the wire member to secure the coating thereon.

BRIEF DESCRIPTION OF THE DRAWINGS

FIG. 2 is a schematic drawing illustrating the method by which the preferred cable is made;

FIG. 3 is a view as seen along line 3—3 of FIG. 2.

DETAILED DESCRIPTION OF THE PREFERRED EMBODIMENT

Figure 1:
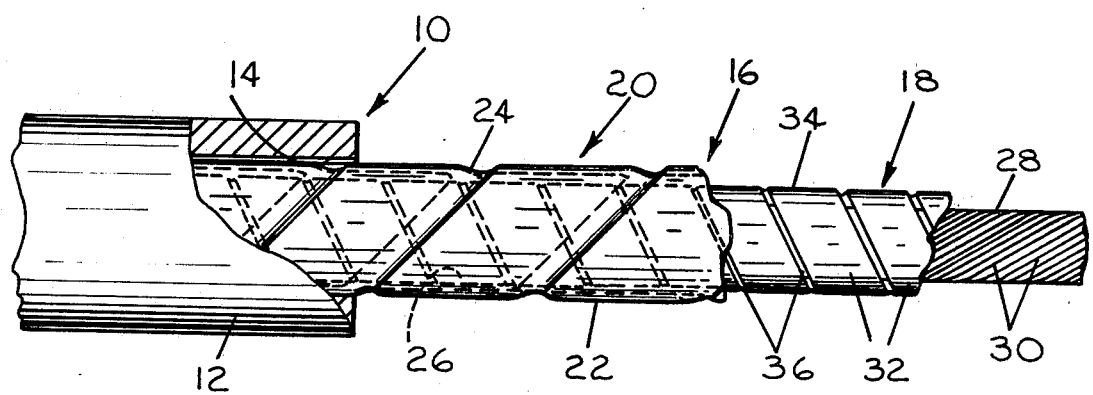
FIG. 1 is a view in elevation of a section of the preferred embodiment of the invention with the various layers broken away to show the interior construction.

Throughout the remainder of the specification and in the claims the polytetrafluoroethylene of the present invention will be referred to as "TFE resin" and should be understood to include any number of similar products which might be sold under a variety of trademarks. Similarly, "FEP resin" will be used to refer to fluorinated ethylenepropylene resin. These terms are chosen to be consistent with those generally used in the art, and, more specifically, with the substances found in the preferred multi-laminar cast tape used to produce the preferred embodiment and sold by the Dilectrix Corporation, 69 Allen Boulevard, Farmingdale, New York under the trademark FLUOROFILM--Type DF-1700.

As seen in FIG. 1, the preferred embodiment of the present invention includes a push-pull type remote control cable 10. The cable 10 includes a conduit 12 having an interior surface layer 14 of nylon. A core 16 includes a metallic core member 18 with a coating 20 thereabout. The coating 20 is formed from a helically wound multi-laminar cast tape 22 in which the outer layer 24 is composed of TFE resin and an inner layer 26 is composed of FEP resin. The term "layer" is used to include the possibility of employing a single tape of FEP resin and a separate tape composed of TFE resin, even though this is not the preferred configuration. As will be understood by those skilled in the winding art, it would be possible to wind the two types of tape simultaneously or separately to provide the same inner "layer" and outer "layer" of the preferred embodiment. The heating method described hereinbelow would cause the FEP resin to be bonded to the core member 18 and to the TFE resin to secure the coatings 20 to the member 18.

The preferred tape 22 is available in a wide variety of thicknesses and widths. It has primarily been used heretofore as an insulation material in the electrical conductor industry. The high temperature resistance combined with nonflammable unique chemical inertness, flexibility at low temperatures and excellent electrical characteristics have made TFE and FEP resins excellent for this application. However, when the preferred tape 22 is recommended for use around an electrical conductor wire, the TFE resin layer is positioned adjacent the wire. This arrangement allows the insulation to be readily stripped from the conductor wire, again illustrating the ineffectiveness of a TFE resin to metallic bond.

The present invention, however, recognizes the desirability in the control cable art of reversing the normal application method. As compared to the TFE resin, which has enormously high melt viscosity, the FEP resin is more like a normal thermoplastic and is subject to typical melt flow processes. It has been found that heating FEP resin in a manner described hereinbelow results in an effective and reliable bond with the metallic core member 18.

The preferred embodiment of FIG. 1 illustrates a core 16 which has been satisfactorily produced to meet the objectives of this invention. The metallic core member 18 includes an interior portion 28 in the form of a plurality of wire strands 30. A pair of 0.020" and 0.090" flat wires 32 are wound about the strands 30 to provide a core that is strong in compression, yet flexible, and, after swaging or rolling, will have a substantially even outer surface 34.

An axial space 36 between adjacent convolutions of the wires 32 does not detract from the effectiveness of the outer surface 34 once it is covered by the coating 20. In the preferred embodiment, the flat wires are rotary swaged, as disclosed in U.S. Pat. No. 2,706,417 and hereby incorporated by reference, to accurately size the outside diameter at 3/32 inches, although as is well known in the art of the cable making, roller burnishing could be alternatively utilized for the core finishing operation. Although the flat wires 32 are preferably stainless steel, it is anticipated that carbon steel or brass or any number of other metals might be utilized.

Although the above described metallic core member 18 is utilized in the preferred embodiment, it should be understood that any number of configurations may be effectively employed in the invention. The metallic core member might be a smooth, solid wire or of any dimension generally used in the control cable art. There is, however, one aspect of the metallic core member which must be considered prior to its utilization in the preferred method of applying the coating 20. It is desirable for the metallic core member to be clean and free of impurities which might interfere with the bonding. For example, when the flat wires 32 are rotary swaged, lubricating oil is employed which tends to collect in the spaces 36 and on the surface 34. Cleaning of the preferred metallic core member 18 has been accomplished by using a liquid-vapor phase degreasing machine such as Model 'HL' type degreaser sold by Baron-Blakeslee, Inc., of Chicago, Illinois, or any other similar machine. A 500' spool of the metallic core member 18 was properly cleaned when soaked for one hour in a perchlorethylene solvent in the machine. If cleaning of the metallic core member to be used is required, a concentrated ultrasonic cleaning method using fluorinated or chlorinated solvents may be considered as an alternative.

As seen in the schematic drawing of FIG. 2 of the preferred method of providing the coating 20, a pay-off spool device 38 includes an ample supply of clean, metallic core member 18. It is the general objective of the process to helically wind the tape 22 around the metallic core member 18, to heat the core 16 to effect a bond between the metallic core member 18 and the FEP resin layer 26 of the tape 22 and to cool the coating 20 so that the finished core 16 may be collected on a take-up spool device 40. Although any number of devices are available in the wire manufacturing field which could be utilized as the pay-off device 38 and the take-up device 40, Model 250 PO 30 Pay-off and Model 200 TU 30 Take-up machines sold by United States Machinery, 500 Chelmsford Road, North Billerica, Massachusetts, were respectively used for this purpose in the preferred configuration.

A dual wheel capstan 42 of a single head tape wrapper 44, such as Model 1500 SHT Multi-Matic Tape Wrapper also sold by United States Machinery, draws the member 18 from the pay-off device 38 as the tape 22 is wrapped thereon. The preferred tape 22 is $\frac{1}{2}$" wide $\times 0.002$" thick. The outer layer is TFE resin and a very thin layer of FEP resin is fabricated as an integral part of one side of the tape 22. The tape 22 is wrapped about the member 18 by the wrapper 44 with the FEP resin layer adjacent the outer surface 34 of the member 18 in a direction opposite the helically wound flat wires 32. In the preferred wrapping, the tape overlaps the preceding convolution by about 45 to 48 percent of its width. Some tension is applied to the tape 22 during winding to insure against displacement prior to heating and to insure that the FEP resin layer will generally remain in contact with the metallic core member during heating despite the tendency of the tape to expand at increased temperatures. It is also felt that tension in the tape will result in a tendency of the FEP resin to generally flow into the spaces 36 for some mechanical bonding in addition to the general chemical bonding afforded by the invention.

For heating and cooling, the take-up device 40 draws the core 16, the member 18 with the tape 22 wrapped thereon, from the capstan 42 through a heating system 46. The heating system 46 includes an array of four radiant heated oven units 48. Each oven unit, as seen in FIG. 3, includes longitudinally extending heating element 50 on three sides of the core 16 passing therethrough. The core 16 initially passes around a guide pulley 52 and up through the first pair of oven units 48. The core 16 then passes over an upper pulley 54 to cause the core 16 to pass downwardly through the other two oven units 48. A lower pulley 56 is aligned to redirect the core 16 through the first pair of units 48. The upper pulley 54 and the lower pulley 56 include at least three axially separated sections so that the core 16 may be directed through each oven unit 48 three times. The axially separated sections keep the member 18 of the core 16, and the tape 22 thereon, separated throughout heating, as seen in FIG. 3. After the third pass down through the last pair of units 48, an additional guide pulley 58 redirects the core 16 toward the take-up device 40.

The preferred heating system 46 was also obtained from United States Machinery, Model RO-40D Oven System. Each heating element 48 is approximately 5 feet long with a heating region 60 approximately 1 inch wide. Each heating element 48 includes an installed thermocouple 62, as generally shown in FIGS. 2 and 3, to determine the relative temperature being generated therein. The actual temperature of the member 18 or the coating 20 as they pass through the element 48 would be extremely difficult to obtain.

However, the preferred tape 22 was properly bonded to the preferred member 18 to form core 16 by causing it to pass three times through the 20 feet of heating elements for a total of 60 feet within the heating region 60. The heating temperature, as indicated by the thermocouple 62, was set at 900° F. with a transport rate of approximately 20 feet per minute. There were indications that these settings obtained a temperature of approximately 640° F. at the tape 22 when the TFE resin was heated to a gel state. Since the FEP resin is expected to melt sufficiently for bonding at 540° F., the 900° F. setting utilized in the above discussed sample also heated the FEP resin sufficiently to effect a bond between the coating 20 and the metallic core member 18. Heating the TFE resin to a gel state is desired in the preferred embodiment to improve the bonding between the FEP resin layer and the TFE resin layer in the regions in which they overlap.

It is essential for the outer layer 24 of the tape 22 to be maintained apart from other portions of the tape 22 when the temperature during formation of the coating 20 causes the TFE resin to gel. When in a gel state, contact would damage the smooth surface of the coating 20 which is needed for an effective cable 10. Although the space between the guide pulley 58 and the take-up device 40 is sufficient in the preferred configuration to allow the coating 20 to cool prior to being wound thereon, a positive means for cooling could be provided if manufacturing rates were greater.

Although the above described procedure is preferred samples of satisfactory core have been obtained by their being hung for heating within a hot air oven. However, because the surfaces must be maintained in a spaced relationship, the actual length of core material which can be produced in this manner was felt to be limited and therefore not preferred. There has also been some indication that the metallic core member 18 might be inductively heated either alone or in combination with some other heating means to produce the above described bonding between FEP resin and the outer surface 34 of the member 18.

Samples of the core 16 which were satisfactorily produced by the method described hereinabove have been examined to verify the bonding which is produced. Specifically, when the finished core 16 is abraded by rubbing against a surface sufficiently to cause coating failure, the coating 20 will disintegrate at the area of contact without the remaining portion of the coating separating from the metal surface 34 of the core member 18.

Accordingly, it can be seen that overlapping of the tape 22 would not be necessary if only a partial coating of the core member 18 is desired. There are some cable applications in which a partial coating of the core might be the preferred configuration. Leaving a gap in the coating allows a lubricant to be provided within the conduit which can further decrease the coefficient of sliding friction. The gap would provide a reservoir for the lubricant and the partial coating would still provide a substantially even outer surface for effective sliding within the conduit 12. It is also of significance that the use of a partial coating might alter the heating step for forming the core 16. If the FEP resin does not overlap the TFE resin layer 26, gelling of the TFE would not be required. Accordingly, the heating temperature can be lower and still effect a strong FEP resin to metal bond since the melting temperature of FEP resin is lower than the gelling temperature of the TFE resin.

What is claimed is:

1. A core capable of being utilized within a conduit in a push-pull type remote control cable assembly, said core comprising:
    a metallic wire member including a plurality of helically wound strands of wire having at least one flat wire helically wound about an outer surface of plurality of said strands with axial space between adjacent convolutions to provide a substantially even outer surface for said wire member; at least a partial coating on said wire member including an outer layer of TFE resin; and an inner layer of said coating include FEP resin bonded to said wire member to secure said coating to said wire member, said FEP resin layer extending into said space.

2. A core as set forth in claim 1 wherein said flat wire is stainless steel.

3. A core as set forth in claim 1 wherein said coating is formed from layered tape which is helically wrapped about said wire member.

4. A core as set forth in claim 3 wherein said tape is wrapped in overlapping convolutions about said wire member and said FEP resin of said inner layer at the areas of overlap are bonded to said TFE resin of said outer layer of said tape.

5. A core as set forth in claim 4 wherein said coating includes at any one location thereon a maximum of two thicknesses of said tape.

6. A push-pull type remote control cable assembly comprising:
    a conduit having an inner surface of nylon;
    a core disposed inwardly of said conduit and capable of being axially displaced relative to said conduit;
    said core having a base metallic material and at least a partial coating about said metallic material; and
    said coating having an outer surface of TFE resin to provide a low-friction contact between said coating and said inner surface of said conduit and an inner surface of FEP resin which is bonded to said metallic material to secure said coating thereabout.

7. A core capable of being utilized within a conduit in a push-pull type remote control cable assembly, said core comprising:
    a metallic wire member;
    at least a partial coating on said wire member;
    said metallic wire member including a plurality of helically wound strands of wire having at least one flat wire helically wound about an outer surface of a plurality of said strands to provide a substantially even outer surface for said wire member with an axial space between adjacent convolutions of said flat wire and said coating extending into said space.

8. A core as set forth in claim 7 wherein said flat wire is stainless steel.

9. A core as set forth in claim 7 wherein said coating is formed from layered tape which is helically wrapped about said wire member.

10. A core as set forth in claim 9 wherein said tape is wrapped in overlapping convolutions about said wire member.

11. A core as set forth in claim 10 wherein said coating includes at any one location thereon a maximum of two thicknesses of said tape.

12. The core of claim 9 wherein said tape does not overlap in being wrapped about said wire.

13. A core as set forth in claim 7 wherein the FEP resin is chemically bonded to the wire member to secure the coating to the wire member.

* * * * *